US010664598B1

(12) United States Patent
Righi et al.

(10) Patent No.: US 10,664,598 B1
(45) Date of Patent: May 26, 2020

(54) FIRMWARE SECURITY PATCH DEPLOYMENT

(71) Applicant: American Megatrends International, LLC, Norcross, GA (US)

(72) Inventors: Stefano Righi, Lawrenceville, GA (US); Madhan B. Santharam, Duluth, GA (US); Amanda Nicole Stark, Gainesville, GA (US)

(73) Assignee: American Megatrends International, LLC, Norcross, GA (US)

( * ) Notice: Subject to any disclaimer, the term of this patent is extended or adjusted under 35 U.S.C. 154(b) by 167 days.

(21) Appl. No.: 15/677,669

(22) Filed: Aug. 15, 2017

Related U.S. Application Data

(60) Provisional application No. 62/375,296, filed on Aug. 15, 2016.

(51) Int. Cl.
*G06F 9/44* (2018.01)
*G06F 21/57* (2013.01)
*G06F 8/71* (2018.01)
*G06F 8/65* (2018.01)

(52) U.S. Cl.
CPC .............. *G06F 21/572* (2013.01); *G06F 8/71* (2013.01); *G06F 21/575* (2013.01); *G06F 8/65* (2013.01)

(58) Field of Classification Search
CPC .................................................... G06F 9/4401
See application file for complete search history.

(56) References Cited

U.S. PATENT DOCUMENTS

| | | | | |
|---|---|---|---|---|
| 6,477,703 | B1 * | 11/2002 | Smith | G06F 8/65 717/168 |
| 2015/0074386 | A1 * | 3/2015 | Huang | G06F 9/4401 713/2 |
| 2018/0004952 | A1 * | 1/2018 | Samuel | G06F 21/575 |
| 2018/0253555 | A1 * | 9/2018 | Schumacher | G06F 8/654 |

* cited by examiner

*Primary Examiner* — Albert Wang
(74) *Attorney, Agent, or Firm* — Newport IP, LLC; Leonard J. Hope

(57) ABSTRACT

Technologies for receiving and using alternate firmware files of a computer are described herein. In some examples, firmware files to be used instead of currently used firmware files are stored in a firmware volume, which is stored in a UEFI partition. A flag is set indicating the presence of a firmware volume containing the alternate firmware files. At boot time, if it is determined that the flag has been set, the computer will utilize files stored in the firmware volume stored in the UEFI partition rather than corresponding files in a firmware.

20 Claims, 7 Drawing Sheets

FIRMWARE SECURITY PATCH DEPLOYMENT

CROSS-REFERENCE TO RELATED APPLICATIONS

This application claims priority to U.S. Provisional Patent Application Ser. No. 62/375,296, entitled, "Firmware Security Patch Deployment," filed on Aug. 15, 2016, which is herein incorporated by reference in its entirety.

BACKGROUND

In many computing systems, low level instruction code is used as an intermediary between the hardware components of the computing system, the operating software, and other high level software executing on the computing system. This type of low level instruction code is commonly known as a computer system firmware. Examples of computer system firmware include, but are not limited to, Basic Input and Output System ("BIOS") firmware and Unified Extensible Firmware Interface ("UEFI")—compliant firmware. The firmware provides a set of software routines that allows high level software to interact with the hardware components of the computing system using standard calls.

It is not uncommon to need to change the firmware files. These changes can be updates to enhance the performance of the firmware, add features to the firmware, or to prevent potential security issues. In order to change the firmware in conventional systems, the entire firmware is deleted from the non-volatile random access memory ("NVRAM") in which it is stored. The new firmware can then be written to the NVRAM.

The process of deleting and rewriting computer system firmware using conventional technologies can leave a computing system in a vulnerable state. For example, a power interruption or outage during the firmware update process can cause an error in the firmware. These errors can prevent a computer from booting, forcing a user to implement a manual procedure to perform a recovery operation on the firmware in order to allow the computer to start up.

Because of the intrinsic complexity of computer system firmware, and the need to ensure that every computer system can be updated smoothly, a significant amount of time and care is applied to test firmware updates to identify any potential issues. Thus, even though computers may require a firmware update, particularly in the case of a security update, the large amount of testing of firmware updates, in order to ensure that the updates can be applied without compromising the reliability of the platform, often delays the release of such updates.

It is with respect to these considerations and others that the various configurations described below are presented.

SUMMARY

Technologies are disclosed herein for deploying a firmware update (which might also be referred to herein as a "change," "update," or a "patch"). The technologies disclosed herein can be utilized to provide incremental updates to UEFI-compliant firmware. The technologies disclosed herein can also be utilized with other types of computer system firmware.

In one example, a firmware volume in a UEFI framework is used. Particularly, a firmware volume, including an update required to fix or update a firmware, is created and stored in a UEFI-defined system partition. In some examples, a flag can be set indicating to the platform that an alternate firmware file to be used is stored in the UEFI-defined system partition. When this flag is set, the system will use a driver or other files in the firmware update rather than the driver or files originally stored in the firmware.

In some examples, a firmware file change is generated and stored as an alternate in a firmware volume. The firmware volume is then stored in the UEFI-defined system partition. The firmware change can be retrieved in response to a notification to the operating system that a change is available.

In some examples, if the firmware change is pushed to the system by an outside entity or pulled from an outside entity by a process executing on the system, the storage of the firmware volume containing the firmware change can cause an associated update of a variable indicating the presence of a firmware update. For example, the platform can be informed that a firmware volume containing a firmware change has been stored and is ready for use by setting a variable stored in an NVRAM, or in another location accessible to the firmware. When the flag is "set," or otherwise indicates the presence of a firmware volume containing the firmware update, the platform will utilize the files contained in the firmware volume rather than the files contained in the original firmware.

During a boot process, the platform checks for the existence of an alternate firmware file by examining the flag described above. If no an alternate firmware file is indicated as being available, the platform boots in a typical fashion. If an alternate firmware file is indicated as being available, the system will utilize the files stored in the firmware volume in place of the same files that are contained in the firmware. Multiple different firmware changes can be utilized in a similar fashion.

In some examples, a firmware change can be stored in a UEFI system partition, which is typically stored on disk. If, for some reason, an alternate firmware file needs to be removed, the firmware volume containing the alternate firmware simply needs to be removed from the UEFI system partition. Once the firmware volume has been removed from the UEFI system partition, the change contained in that firmware volume will no longer be utilized. Rather, the original files in the firmware will be utilized.

The subject matter described herein can also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
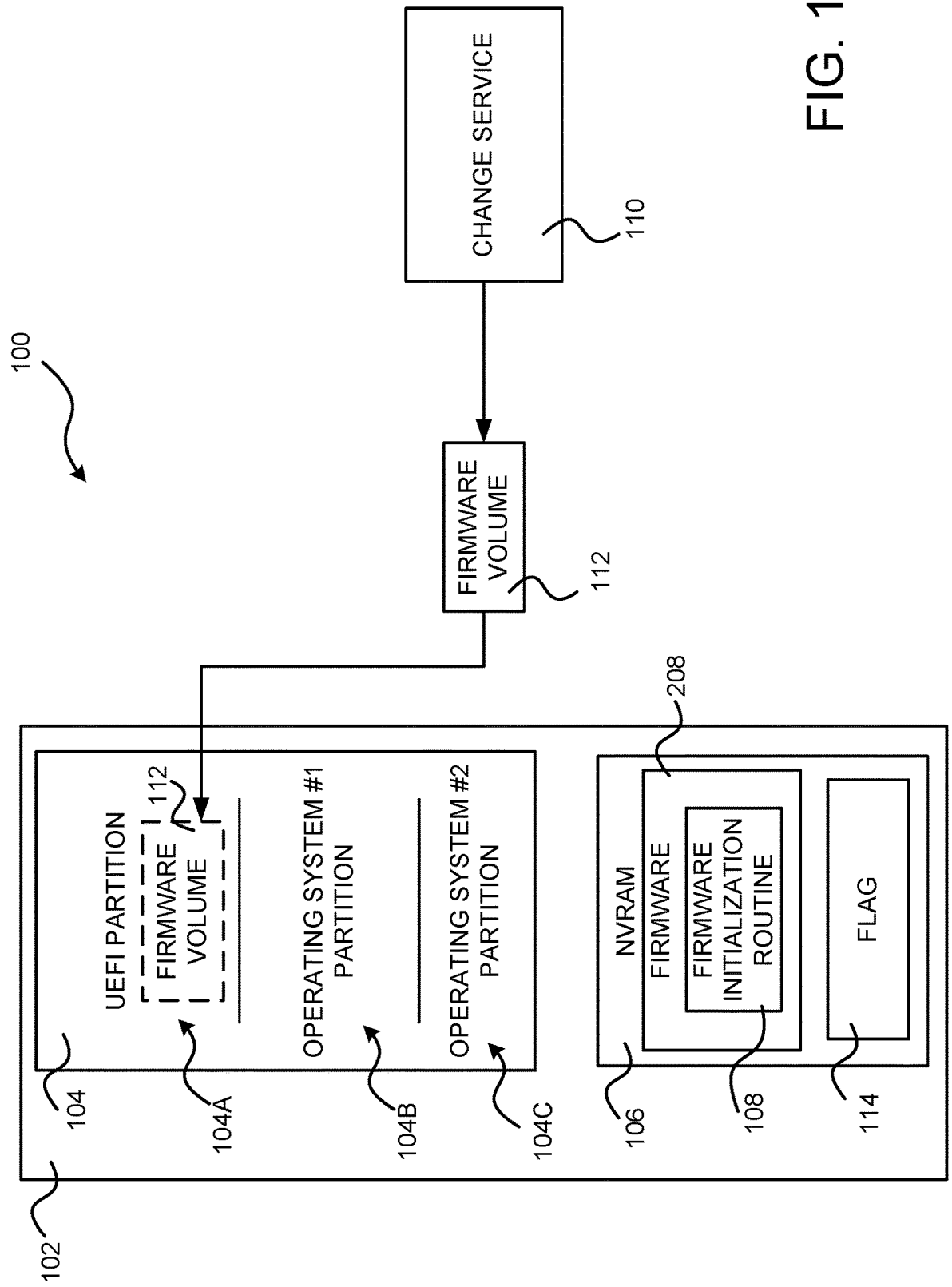
FIG. 1 shows an example computing system configured to receive and apply a firmware volume to update a firmware.

Technologies are disclosed herein to deploy a firmware update to a computing system using, in some examples, the framework of the UEFI specification. Various examples of the technologies disclosed herein make use of a firmware volume. In particular, a firmware volume including updates (e.g. to fix a vulnerability) can be created and stored in the UEFI defined system partition. The usage of such a firmware volume can be controlled through firmware setup, allowing for smooth recovery from the deployment of the updates, if necessary. For example, the firmware volume containing the updates can be removed from the UEFI system partition. Multiple updates can be used in the disclosed manner by storing multiple firmware volumes in the UEFI system partition and utilizing the updates in the manner described above according to their installation sequence.

The disclosed technologies can also be utilized in a secure manner. In particular, Secure Flash and Secure Boot can be enforced. Moreover, the storage of a portion of a computer's firmware outside the BIOS flash ROM can be performed in a secure manner. In order to accomplish this, the same signature validation utilized for a conventional BIOS update can be performed on a firmware volume containing updates at every boot. In this way, a guarantee can be provided that the firmware is untampered with and only updated by the manufacturer of the platform and the original author of the firmware. In addition, the signature could be performed by using the keys associated with Secure Flash, allowing in this case for the creation of firmware volumes containing updates usable only on a specific platform or on a family of platforms from the same OEM, depending upon various factors like the nature of the update (e.g. certain fixes can be identical across multiple platforms, others might be platform-specific). In some examples, performing the signature using the keys associated with the Secure Flash may require the use of a different signing key than the key used for the Secure Flash.

In some examples, the signature verification described above may add to the firmware boot time, but the additional time may only be incurred when updates are present. In this way, only a minimal amount of time may be added to the boot time when updates are available, but at the same time significantly reducing the amount of time required to make the updates available to end users.

It should also be appreciated that some examples of the mechanism described above first detects the availability of memory. Once memory is available, all firmware volumes, including the firmware volume containing the actual firmware and any firmware volumes containing updates, can be copied into RAM in order to make access to the firmware volume faster.

After the firmware volumes have been copied to RAM, the contents of the firmware volumes are analyzed and each file (e.g. driver) is identified through its Globally Unique Identifier ("GUID") included in the header of the FFS file. All other firmware volumes present in the system are checked for the present of the same GUID and, when found, the corresponding FFS file is marked as deleted as allowed by the FFS specification. The corresponding older version of the drivers present in the firmware volume are deleted before being used (e.g. by the Driver Execution Environment ("DXE") dispatcher in a UEFI-compliant system). In some examples, a search is used throughout all of the firmware volumes because it is possible to have multiple firmware volumes containing the same files, in which case only the newest of the files is to be utilized to supersede any other preexisting files in previous firmware volumes.

A special case can occur in a UEFI-compliant system where the DXE core needs to be replaced by a security patch. In this case, if the GUID for the DXE core has been patched, the process "DXE IPL" will pass to the new "DXE IPL" included in the firmware volume containing the updates. This special case needs to be addressed because DXE IPL does not use the DXE dispatcher that honors FFS and firmware volume flags, but passes control to the DXE core simply by loading and calling the entry point without making use of the functions honoring the FFS and firmware volume flags. As a result of this process, the system will run as if a new BIOS image with the patched driver is used.

When a completely new firmware is released, the process for updating the entire BIOS can also remove all of the firmware volumes containing updates stored in the UEFI system partition in order to avoid continued use of the updates. This can also speed up boot time by removing the additional time required to verify and load the updates from firmware volumes in the UEFI system partition.

In the following detailed description, references are made to the accompanying drawings that form a part hereof, and in which are shown by way of illustration specific configurations or examples. Referring now to the drawings, aspects of the various implementations provided herein and an exemplary operating environment will be described.

While the technical details are presented herein in the general context of program modules that execute in conjunction with the execution of a runtime environment and a computer firmware, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

FIG. 1 is an example system 100 for changing a firmware file by using an alternate firmware file. In the system 100, a computer 102 includes data storage device 104. The data storage device 104 includes a UEFI system partition 104A. The data storage device 104 can also include several partitions for storing operating systems, such as the operating system #1 partition 104B, and an operating system #2 partition 104C. A partition is a portion of storage space, such as on a hard disk or a SSD drive, allocated for a particular use. As used herein, UEFI means "Unified Extensible Firmware Interface," and is a specification that defines a software interface between an operating system and platform firmware. The UEFI system partition 104A is a partition on the data storage device 104 that is used by the computer 102 when the computer 102 is powered up and booted. UEFI firmware loads files stored on the UEFI system partition 104A to initialize the computer 102 and place the system in condition for booting by an operating system.

The computer 102 can also include an NVRAM 106. A firmware, including a firmware initialization routine 108 can be stored in the NVRAM 106. In some examples, the firmware initialization routine 108 is a process performed by firmware or software routines after the computer 102 is powered on. Some functions of the firmware initialization routine 108 include, but are not limited to, a power on self-test ("POST") process that verifies the integrity of the firmware, finds and initializes system memory, and identifies and organizes devices available for booting.

As noted above, in some instances, the firmware 208 of the computer 102 may need to be changed. In these examples, a change service 110 may provide a firmware volume 112 containing a firmware change to the computer 102. The firmware volume 112 contains files used by the firmware 208 that are new or updated and that are to be used in place of files contained in the firmware 208. The firmware volume 112 can be provided in various ways. For example, the firmware volume 112 can be provided upon a request or prompt by the computer 102 (a "pull" operation) or the firmware volume 112 can be provided by the change service 110 downloading the firmware volume 112 into the computer 102 (a "push" operation). It should be noted, however, that the firmware volume 112 can be provided to the computer 102 using other technologies or techniques.

The firmware volume 112 containing the firmware change is received by the computer 102 and stored in the UEFI system partition 104A of the data storage device 104. To indicate that the firmware volume 112 is stored in the UEFI system partition 104A and is ready to be applied, a flag 114 (or other variable) can be set in the NVRAM 106. During a boot process, the computer 102 executes the firmware initialization routine 108. The firmware initialization routine 108 will determine whether the flag 114 has been set. If the flag 114 has not been set, the firmware initialization routine 108 will boot the computer 102 in a standard fashion. If, however, the flag 114 has been set, the computer 102 will utilize the files contained in the firmware volume 112 rather than the files contained in the original firmware 208.

If the flag 114 is set, the computer 102 will access files stored in the firmware volume 112 during the boot process rather than a corresponding firmware volume containing the firmware 208 (not illustrated in FIG. 1). In some examples, the firmware volume 112 may not contain all the files included in the firmware 208. In those examples, the firmware 208 will be read into memory, but the files replaced by volume 112 will not be used. Because the contents of the firmware volume storing the firmware 208 are not modified at all by the process described above, the computer 102 can be reconfigured to access the outdated firmware volume containing the outdated firmware 208 rather than the firmware volume 112 by removing or changing the flag 114. In some examples, reconfiguration is provided to rollback changes if there are issues with using firmware volume 112 with the firmware 208. In some examples, direct input such as human user input at the device, may be required because of potential security concerns. For example, nefarious or rogue software may simply delete the firmware volume 112 and reintroduce the vulnerability intended to be fixed.

In some examples, the computer 102 can be configured to allow a user or other entity to override the flag 114 (or other flags if other firmware volumes are stored in the UEFI system partition 104A). For example, a user can be provided with a graphical user interface that lists all the updates (or firmware volumes downloaded and stored in the UEFI system partition 104A). The user can select or deselect the updates to be applied. Once received, the computer 102 can continue the boot process, only accessing the contents of the selected firmware volumes.

Figure 2:
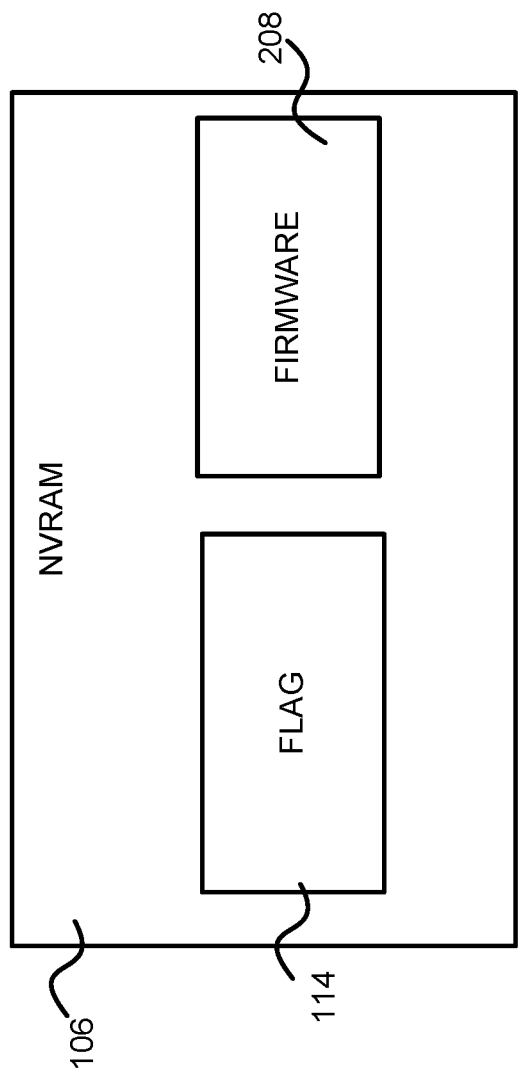
FIG. 2 is a block diagram showing a firmware initialization routine stored in the NVRAM to execute a firmware.

FIG. 2 is a block diagram showing additional aspects of the contents of the NVRAM 106. As explained above with regard to FIG. 1, when the firmware volume 112 is stored in the UEFI system partition 104A, the flag 114 is set. As used herein, a flag is "set" when a variable associated with the flag is of a value or setting that, when accessed by the firmware 208, the boot process will cause the firmware 208 to utilize files contained in the firmware volume 112 associated with the flag 114 rather than corresponding files in the original firmware 208. In some examples, more than one flag can be utilized.

Figure 3:
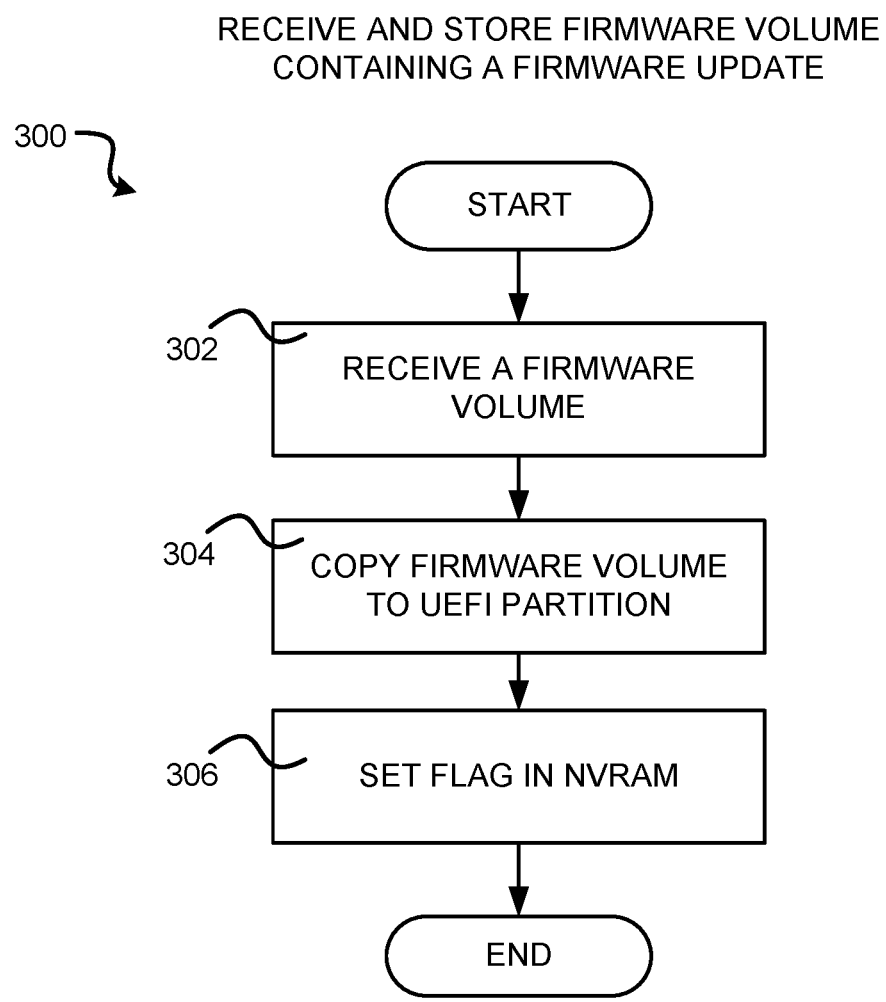
FIG. 3 is a flow diagram showing one illustrative routine performed by a computing system to download a firmware volume to update a firmware.

FIG. 3 is a flow diagram showing one illustrative routine 300 performed by the system 100 to download the firmware volume 112 that contains the files for changing the firmware 208. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the configurations described herein are implemented.

Accordingly, the logical operations making up the implementations described herein are referred to variously as operations, structural devices, acts or modules. It will be recognized by one skilled in the art that these operations, structural devices, acts and modules can be implemented in software, in firmware, in special purpose digital logic, and any combination thereof without deviating from the spirit and scope of the present disclosed subject matter as recited within the claims set forth below.

The routine 300 begins at operation 302, where the firmware volume 112 is received. As noted above, the firmware volume 112 can be provided to the computer for various reasons and delivered using various technologies. For example, the firmware volume 112 can be pushed to the computer 102 by the change service 110. In other examples, the firmware volume 112 can be pulled from the change service 110 by the computer 102.

The routine 300 continues to operation 304, where the firmware volume 112 is copied to the UEFI system partition 104A. It should be noted that, in some examples, the firmware volume 112 can be copied to other memory storage locations. The presently disclosed subject matter is not limited to any particular location.

The routine 300 continues to operation 306, where the flag 114 is set. The flag 114 can be set by the modification of a variable associated with the flag 114. When set, the flag 114 indicates to the computer 102 executing the firmware initialization routine 108 that the files contained in the associated firmware volume 112 stored in the UEFI system partition 104A are to be used in place of corresponding files stored in the firmware volume, which might also be stored in the NVRAM 106. As discussed in greater detail below, if the flag 114 is not set, the computer 102 continues executing the firmware initialization routine 108 without use of the files contained in the firmware volume 112. The routine 300 thereafter ends.

Figure 4:
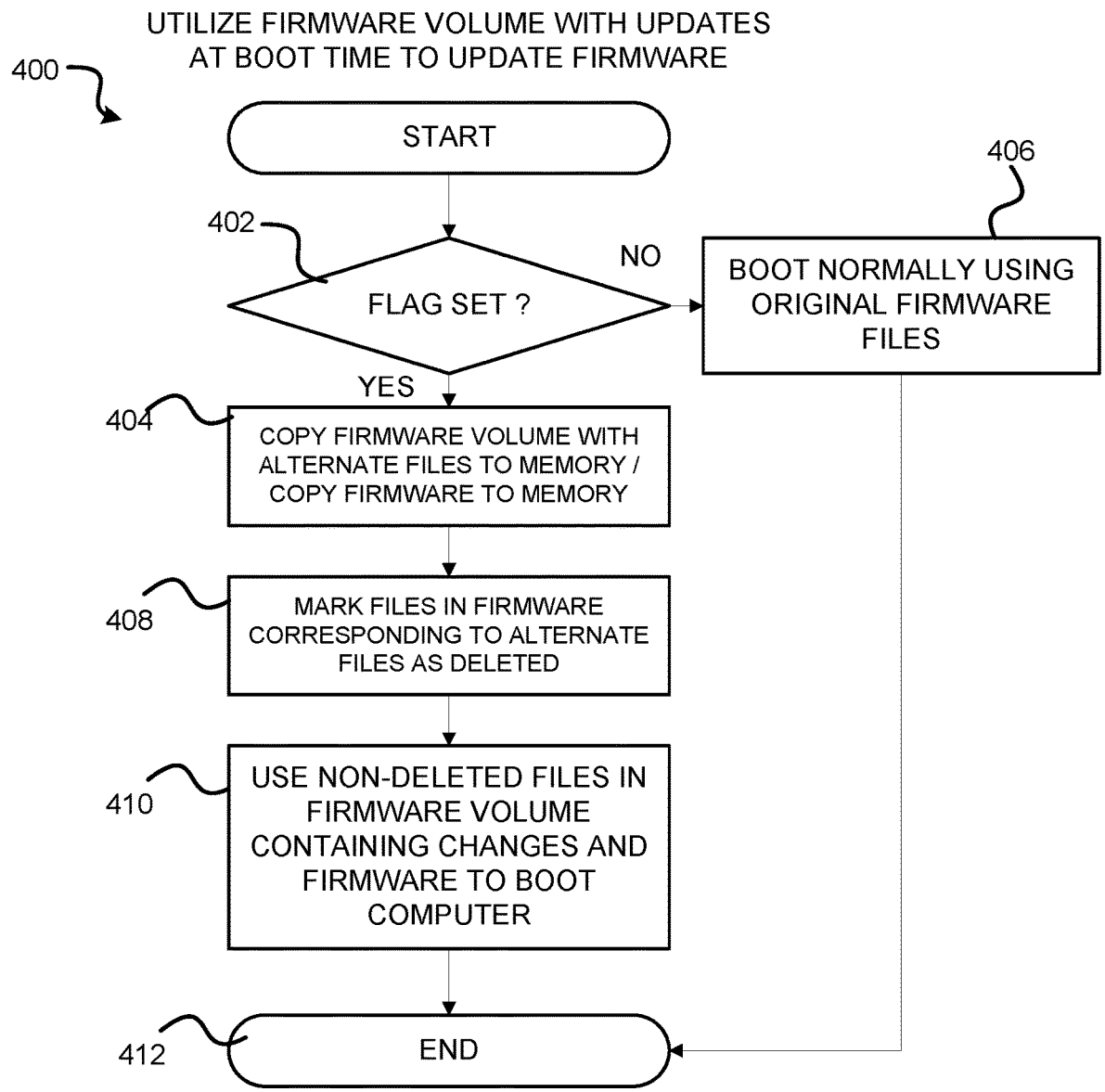
FIG. 4 is a flow diagram showing one illustrative routine performed by a computing system to access a firmware update stored in a firmware volume.

FIG. 4 is a flow diagram showing one illustrative routine 400 performed by the system 100 to utilize the files stored in the firmware volume 112 at boot time of the computer 102. The routine 400 commences at operation 402, where a determination is made as to whether or not the flag 114 is set.

If the flag 114 is set, indicating that a firmware volume 112 containing updates to the firmware 208 is present and should be used, the routine 400 proceeds to operation 404, described below. If the flag 114 is not set, indicating that no firmware volume 112 is to be used, the operation 406 of the routine continues to operation 412, where it ends.

At operation 404, the firmware 208 is copied to random access memory ("RAM") from the NVRAM. Additionally, the firmware volume 112 containing the updates to the firmware 208 is also is copied to RAM.

The routine 400 continues from operation 404 to operation 408, where the files in the firmware 208 that are being updated by files in the firmware volume 112 are marked as deleted in the firmware file system ("FFS") of the firmware volume containing the firmware 208 in RAM. The routine 400 then proceeds from operation 408 to operation 410.

At operation 410, the non-deleted files in both the firmware volume 112 and the firmware 208 are utilized to boot the computer. In this manner, a single file in the firmware 208 can be replaced by adding the file to the firmware volume 112 and marking the original file in the firmware 208 stored in RAM as deleted. Additionally, if a problem occurs with the updated files contained in the firmware volume 112, the firmware volume 112 can be deleted from the UEFI system partition to return the computer to its original state. From operation 410, the routine 400 proceeds to operation 412, where it ends. In view of the above, it is to be appreciated that the disclosed technologies include systems and methods that can be utilized in the framework of the UEFI specification to address various technical challenges.

Figure 5:
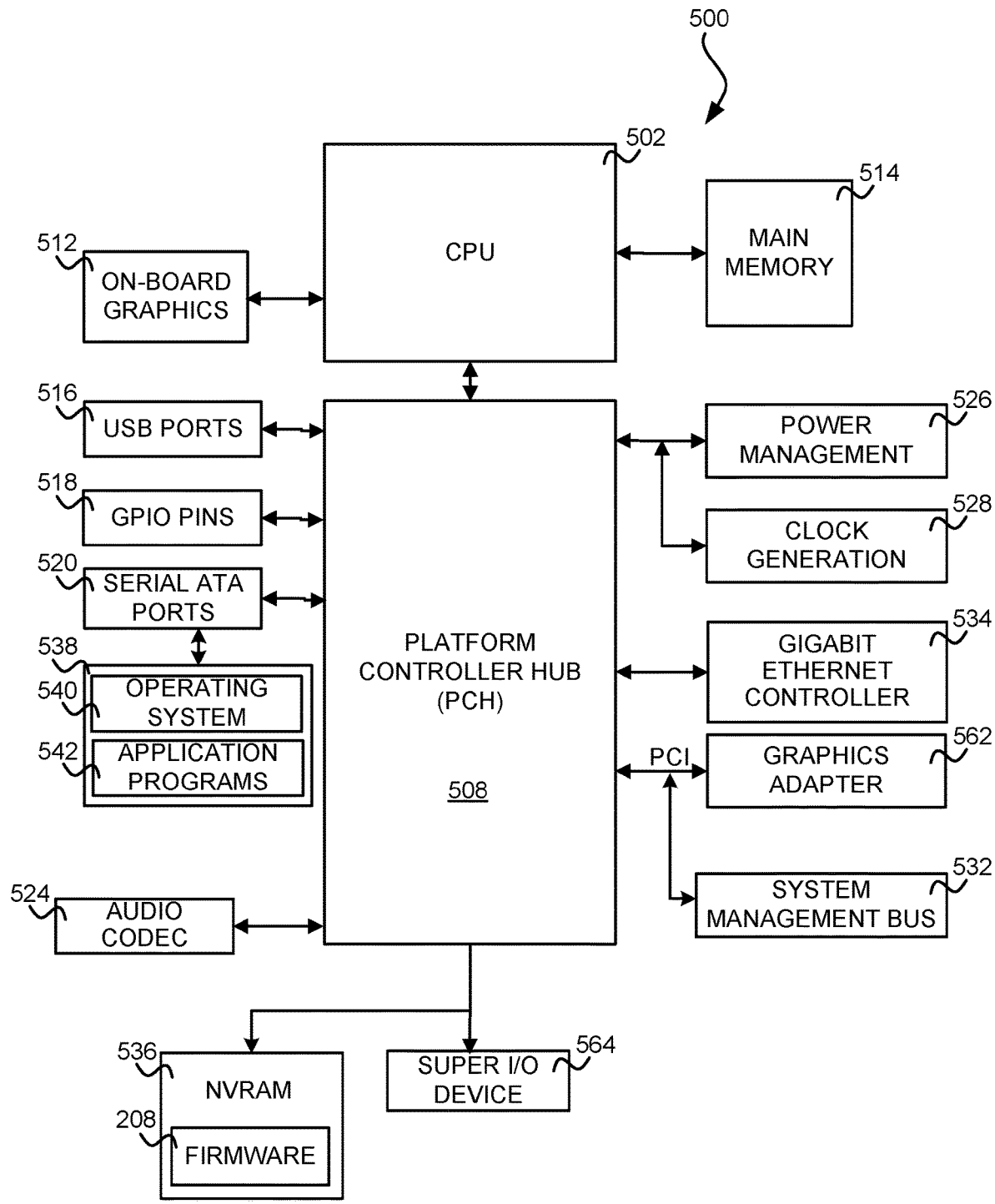
FIG. 5 is a computer architecture diagram that illustrates various components of a computer that provides an illustrative operating environment for the configurations disclosed herein.

Referring now to FIG. 5, an illustrative computer architecture for practicing the technologies disclosed herein will be described. It should be appreciated that although the embodiments described herein are discussed in the context of a conventional desktop or server computer, the embodiments can be utilized with virtually any type of computing device.

In order to provide the functionality described herein, the computing system 500 can include a baseboard, or "motherboard," which can be a printed circuit board to which a multitude of components or devices can be connected by way of a system bus or another electrical communication path. In one illustrative embodiment, a central processing unit ("CPU") 502 operates in conjunction with a Platform Controller Hub ("PCH") 508. The CPU 502 can be a standard central processor that performs arithmetic and logical operations necessary for the operation of the computing system 500. The computing system 500 can include a multitude of CPUs 502. Each CPU 502 might include multiple processing cores.

The CPU 502 provides an interface to a random access memory ("RAM") used as the main memory 514 in the computing system 500 and, possibly, to an on-board graphics adapter 512. The PCH 508 can provide an interface between the CPU 502 and the remainder of the computing system 500.

The PCH 508 can also be responsible for controlling many of the input/output functions of the computing system 500. In particular, the PCH 508 can provide one or more universal serial bus ("USB") ports 516, an audio codec 524, a gigabit Ethernet controller 534, and one or more general purpose input/output ("GPIO") pins 518. The USB ports 516 can include USB 2.0 ports, USB 3.0 ports and USB 3.1 ports among other types of USB ports. The audio codec 524 can include Intel High Definition Audio, Audio Codec '97 ("AC'97") and Dolby TrueHD among others. Power management circuitry 526 and clock generation circuitry 528 can also be utilized through the PCH 508.

The PCH 508 can also include functionality for providing networking functionality through a gigabit Ethernet controller 534. The gigabit Ethernet controller 534 is capable of connecting the computing system 500 to another computing system via a network. Connections which can be made by the gigabit Ethernet controller 534 can include LAN or WAN connections. LAN and WAN networking environments are commonplace in offices, enterprise-wide computer networks, intranets, and the Internet.

The PCH 508 can also provide a bus for interfacing peripheral card devices such as a graphics adapter 562. The bus can be implemented as a Peripheral Component Interconnect ("PCI") bus, a Peripheral Component Interconnect eXtended ("PCI-X") bus or a Peripheral Component Interconnect Express ("PCIe") bus among others. The PCH 508 can also provide a system management bus 532 for use in managing the various components of the computing system 500.

The PCH 508 is also configured to provide one or more interfaces for connecting mass storage devices to the computing system 500. For instance, according to an embodiment, the PCH 508 includes a serial advanced technology attachment ("SATA") adapter for providing one or more serial ATA ports 520. The serial ATA ports 520 can be connected to one or more mass storage devices, such as the SATA disk drive 538, storing an operating system 540 and application programs 542. As known to those skilled in the art, an operating system 540 comprises a set of programs that control operations of a computer and allocation of resources. An application program 542 is software that runs on top of the operating system 540 software, or other runtime environment, and uses computer resources to perform application specific tasks desired by the user.

According to one embodiment of the invention, the operating system 540 comprises the LINUX operating system. According to another embodiment of the invention the operating system 540 comprises a version of the WINDOWS operating system from MICROSOFT CORPORATION. According to other embodiments, the operating system 540 can comprise the LINUX or APPLE OSX operating systems. It should be appreciated that other operating systems can also be utilized.

The mass storage devices connected to the PCH 508, and their associated computer-readable storage media, provide non-volatile storage for the computing system 500. Although the description of computer-readable storage media contained herein refers to a mass storage device, such as a hard disk or CD-ROM drive, it should be appreciated by those skilled in the art that computer-readable storage media can be any available media that can be accessed by the computing system 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical disk storage, magnetic cassettes, magnetic tape, magnetic disk storage or other magnetic storage devices, or any other non-transitory medium which can be used to store the desired information and which can be accessed by the computing system 500.

A low pin count ("LPC") interface can also be provided by the PCH 508 for connecting a Super I/O device 564. The Super I/O device 564 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 536 for storing a firmware 208 that includes program code containing the basic routines that help to start up the computing system 500 and to transfer information between elements within the computing system 500. Some examples of firmware 208 include a BIOS firmware, a UEFI-compliant firmware, or an Open Firmware, among others.

It should be appreciated that the program modules disclosed herein, including the firmware 208, can include software instructions that, when loaded into the CPU 502 and executed, transform a general-purpose computing system into a special-purpose computing system customized to facilitate all, or part of, the operations disclosed herein. As detailed throughout this description, the program modules can provide various tools or techniques by which the computing system 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the gigabit Ethernet controller 534), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media; whether the storage media are characterized as primary or secondary storage; and the like. For example, if the storage media are implemented as semiconductor-based memory, the program modules can transform the physical state of the semiconductor memory when the software or firmware 208 is encoded therein. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the computing system 500 can comprise other types of computing devices, including hand-held computers, embedded computer systems, smartphones, tablet computing devices, and other types of computing devices known to those skilled in the art. It is also contemplated that the computing system 500 might not include all of the components shown in FIG. 5, can include other components that are not explicitly shown in FIG. 5, or can utilize an architecture completely different than that shown in FIG. 5.

Figure 6:
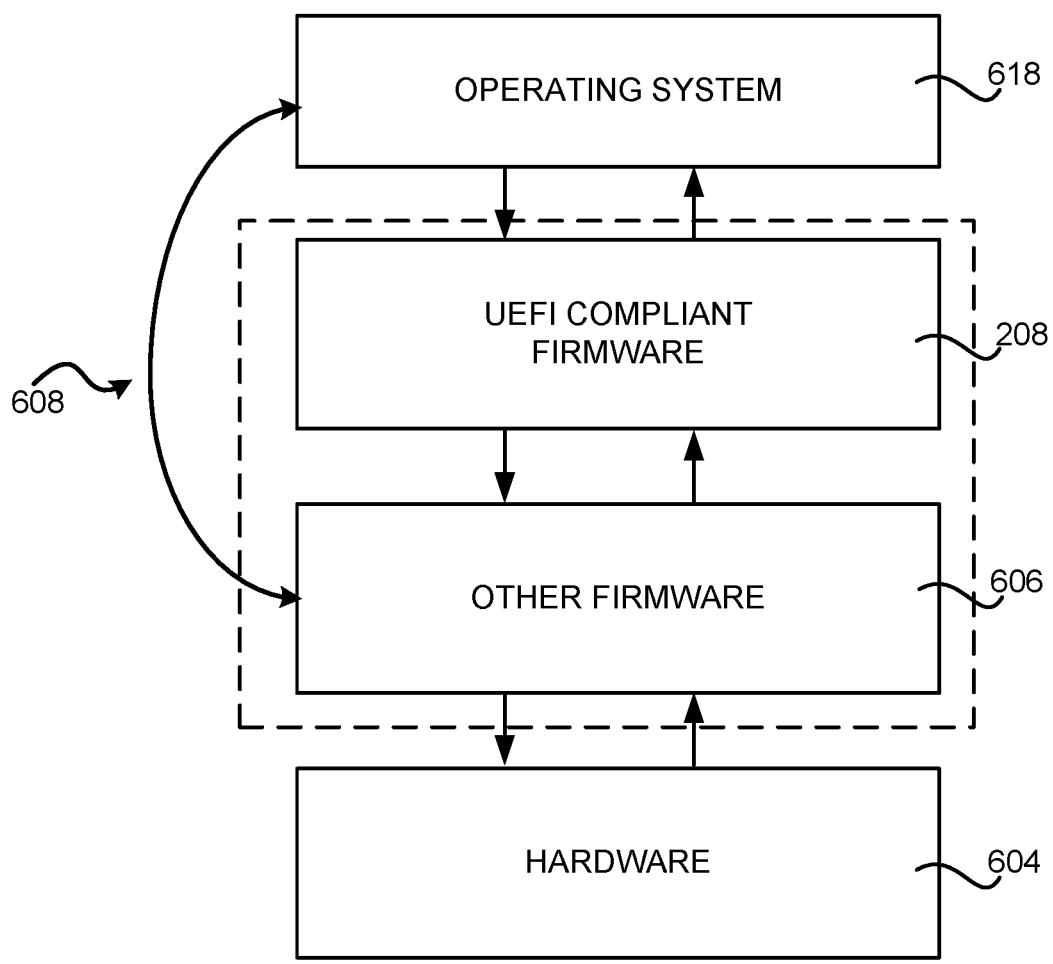
FIGS. 6 and 7 are software architecture diagrams that illustrate aspects of a firmware environment utilized by examples described herein, according to an example.

Referring now to FIG. 6, additional details regarding the operation of the firmware 208 will be described. As known to those skilled in the art, the firmware 208 of a PC-compatible computer provides an interface between an O/S 618 and hardware 604 of the computing environment 500. In some examples, the firmware 208 can comprise a firmware 208 compatible with the UEFI specification from the UEFI forum.

The UEFI specification describes an interface between the O/S 618 and the firmware 208. The UEFI specification defines the interface that platform firmware must implement, and the interface that the O/S 618 can use in booting. How the firmware implements the UEFI specification is left up to the manufacturer of the firmware. The intent of the specification is to define a way for the O/S 618 and firmware 208 to communicate only information necessary to support the operating system boot process. This is accomplished through a formal and complete abstract specification of the software-visible interface presented to the operating system by the platform and the firmware.

According to one implementation of the UEFI specification on INTEL CORPORATION IA-32 platforms, both the UEFI compliant firmware 208 and another type of firmware 606 (e.g. a "legacy" BIOS") can be utilized. This allows users and system integrators to support both firmware interfaces. In order to provide this functionality, an interface 608 can be provided for use by legacy operating systems and applications. Additional details regarding the architecture and operation of the firmware 208 is provided below. Moreover, additional details regarding the operation and architecture of the firmware 208 can be found in the UEFI specification which is available from the UEFI forum.

Figure 7:
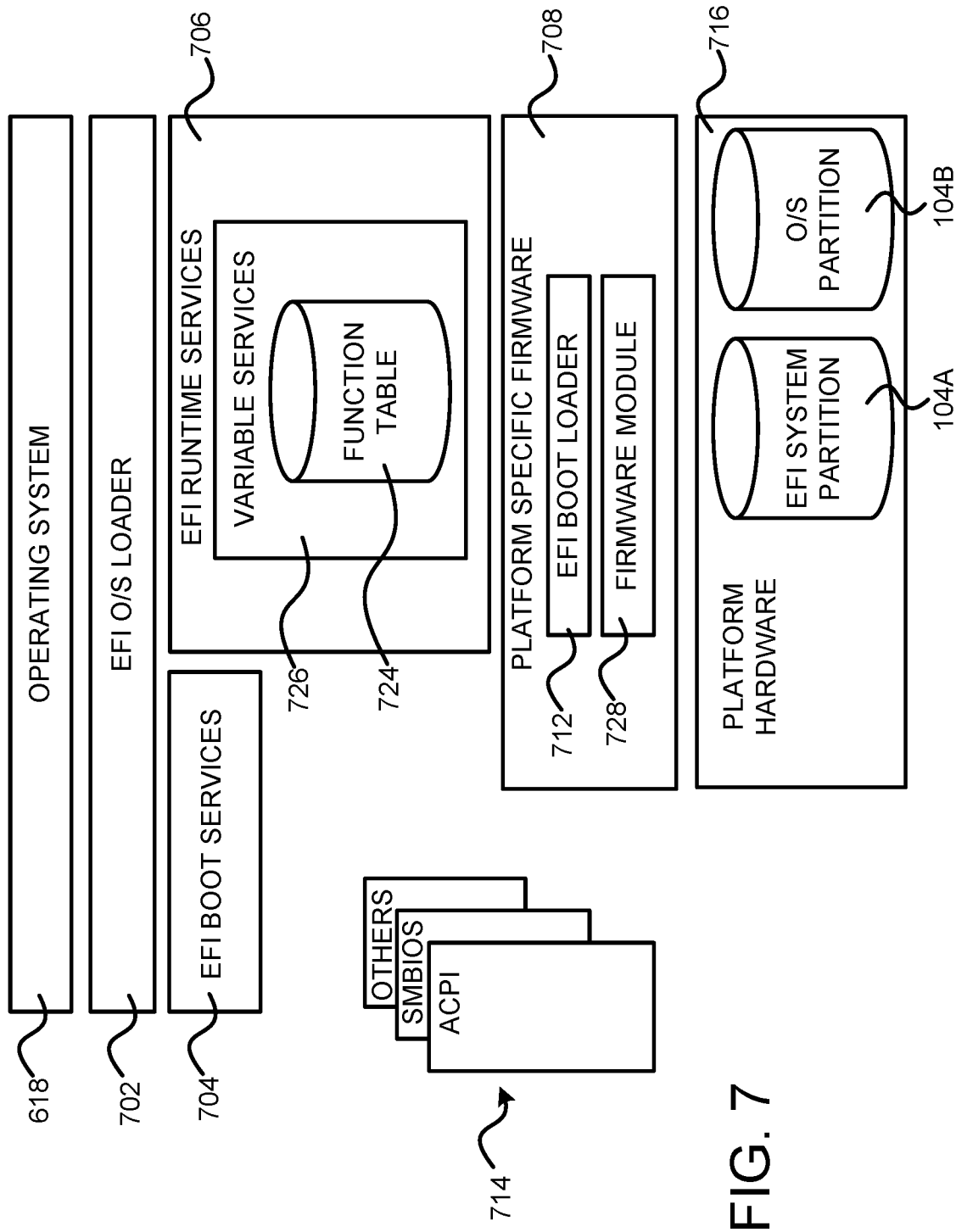

Turning now to FIG. 7, additional details regarding a UEFI specification-compliant system utilized to provide an operating environment for the various implementations presented herein will be described. As shown in FIG. 7, the system includes platform hardware 716 and platform specific firmware 708. The platform specific firmware 708 can retrieve an O/S image from the EFI system partition 104A using an EFI O/S loader 702. The EFI system partition 104A can be an architecturally shareable system partition. As such, the EFI system partition 104A defines a partition and file system that are designed to allow safe sharing of mass storage between multiple vendors. As discussed above, one or more O/S partitions 104B and 104C can also be utilized.

Once started, the EFI O/S loader 702 continues to boot the complete operating system 618. In doing so, the EFI O/S loader 702 can use EFI boot services 704, UEFI runtime services 706, and an interface to other supported specifications to survey, comprehend, and initialize the various platform components and the operating system software that manages them. Thus, interfaces 714 defined by other specifications can also be present on the system. For example, ACPI and the System Management BIOS ("SMBIOS") specifications can be supported, among other interfaces.

UEFI boot services 704 can provide interfaces for devices and system functionality used during boot time. UEFI runtime services 706 can also be available to the UEFI boot loader 712 during the boot phase. For example, a set of runtime services can be presented to ensure appropriate abstraction of base platform hardware resources used by the OS 618 during its operation. UEFI allows extension of platform firmware by loading UEFI driver and UEFI application images which, when loaded, have access to UEFI-defined runtime and boot services. Various program modules can provide the boot-time and run-time services. The EFI runtime services 706 can include a function table 724, which is a table of functions and associated pointers relating to functions associated with program modules, such as device drivers. The EFI runtime services 706 can also include variable services 726 that get, set, and query variables. A firmware module 728 can include a collection of software routines and functions that communicate directly with hardware.

Based on the foregoing, it should be appreciated that technologies have been described herein for obtaining and utilizing a firmware update. Moreover, although the configurations described herein have been described in language specific to computer structural features, methodological acts and by computer readable media, it is to be understood that the disclosed subject matter defined in the appended claims is not necessarily limited to the specific structures, acts or media described. Therefore, the specific structural features, acts and mediums are disclosed as exemplary configurations implementing the claimed disclosed subject matter.

The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A computer-implemented method, comprising:
    at a boot time of a computer, determining if a flag has been set indicating that the computer has received one or more volume of files comprising at least one update file for replacing at least one firmware file of a firmware volume of installed computer firmware; and
    in response to determining that the flag has been set,
        copying, the volume of files, to a computer memory;
        copying the installed computer firmware to the computer memory; and
        booting the computer from the computer memory using the volume of files and the installed computer firmware, wherein the booting utilizes the at least one update file instead of the at least one firmware file.

2. The computer-implemented method of claim 1, further comprising:
    prior to booting the computer, receiving the volume of files;
    storing the volume of files in a Unified Extensible Firmware Interface (UEFI) partition; and
    setting the flag indicating that the computer has received the volume of files, wherein the flag further indicates that the volume of files has been stored in the UEFI partition.

3. The computer-implemented method of claim 2, further comprising, in response to determining that the flag has been set, marking the at least one firmware file corresponding to the at least one update file as deleted.

4. The computer-implemented method of claim 1, further comprising
    providing a selectable list of the at least one update file to be utilized by the computer; and
    receiving a selection indicative of the at least one update file; and
    booting the computer based on the selection indicative of the at least one update file.

5. The computer-implemented method of claim 1, further comprising receiving the volume of files from a service through a push operation from the service.

6. The computer-implemented method of claim 1, further comprising receiving the volume of files from a service through a pull operation responsive to a request generated by the computer.

7. The computer-implemented method of claim 1, further comprising receiving an input to override the flag to deselect a file of the volume of files received.

8. A computer-readable storage medium having computer-executable instructions stored thereupon which, when executed by a computer, cause the computer to:
    at a boot time of a computer, determine if a flag has been set indicating that the computer has received one or more volume of files comprising at least one update file for replacing at least one firmware file of a firmware volume of installed computer firmware; and
    in response to determining that the flag has been set,
        copy the volume of files to a computer memory, wherein the volume of files comprises at least one update file configured to update at least one firmware file of the installed computer firmware;
        copy, to the computer memory, the installed computer firmware; and
    boot the computer from the computer memory using the volume of files and the installed computer firmware, wherein the booting utilizes the at least one update file instead of the at least one firmware file.

9. The computer-readable storage medium of claim 8, comprising further computer-executable instructions to:
    receive the volume of files;
    store the volume of files in a Unified Extensible Firmware Interface (UEFI) partition; and
    set the flag indicating that the computer has received the volume of files, wherein the flag further indicates that the volume of files has been stored in the UEFI partition.

10. The computer-readable storage medium of claim 9, comprising further computer-executable instructions to, in response to determining that the flag has been set, marking the at least one firmware file corresponding to the at least one update file as deleted.

11. The computer-readable storage medium of claim 8, comprising further computer-executable instructions to:
    provide a selectable list of the at least one update file to be utilized by the computer; and
    receive a selection indicative of the at least one update file from the at least one firmware update file, and booting the computer based on the selection of the at least one update file.

12. The computer-readable storage medium of claim 8, comprising further computer-executable instructions to:
receive the volume of files from a service through a push operation from the service.

13. The computer-readable storage medium of claim 8, comprising further computer-executable instructions to:
receive the volume of files from a service through a pull operation initiated in response to a request generated by the computer.

14. The computer-readable storage medium of claim 8, comprising further computer-executable instructions to:
receive an input to override the flag to deselect a file of the volume of files received.

15. A computer, comprising:
a processor; and
a computer-readable storage medium having computer-executable instructions stored thereupon which, when executed by the processor, cause the apparatus to:
receive one or more volume of files comprising at least one update file for replacing at least one firmware file of a firmware volume of installed computer firmware
store the volume of files in a Unified Extensible Firmware Interface (UEFI) partition;
set a flag indicating the volume of files has been stored in a UEFI partition;
at a boot time of the computer,
determine if the flag has been set;
in response to determining that the flag has been set, copying the volume of files to a computer memory;
copying the installed computer firmware to the computer memory; and
booting the computer from the computer memory using the volume of files and the installed computer firmware instead of the at least one firmware file.

16. The computer of claim 15, wherein the computer-readable storage medium comprises further computer-executable instructions to, in response to determining that the flag has been set, mark the at least one firmware file corresponding to the at least one update file as deleted.

17. The computer of claim 15, wherein the computer-readable storage medium comprises further computer-executable instructions to:
provide a selectable list of the firmware update files to be used by the firmware; and
receive a selection indicative of the at least one update file, and boot the computer based on the selection of the at least one update file.

18. The computer of claim 15, wherein the computer-readable storage medium comprises further computer-executable instructions to receive the volume of files from a service through a push operation from the service.

19. The computer of claim 15, wherein the computer-readable storage medium comprises further comprising computer-executable instructions to receive the volume of files from a service through a pull operation initiated in response to a request generated the computer.

20. The computer of claim 15, wherein the computer-readable storage medium comprises further computer-executable instructions to receive an input to boot the computer utilizing the at least one firmware file and not the at least one update file based on the input to override the flag.

* * * * *